United States Patent
Ohlsson et al.

(10) Patent No.: US 9,854,508 B2
(45) Date of Patent: Dec. 26, 2017

(54) DOWNLOADABLE ISIM

(75) Inventors: Oscar Ohlsson, Huddinge (SE); Luis Barriga, Bandhagen (SE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 505 days.

(21) Appl. No.: 13/817,623

(22) PCT Filed: Aug. 31, 2010

(86) PCT No.: PCT/EP2010/062751
§ 371 (c)(1),
(2), (4) Date: Feb. 19, 2013

(87) PCT Pub. No.: WO2012/028179
PCT Pub. Date: Mar. 8, 2012

(65) Prior Publication Data
US 2013/0148585 A1    Jun. 13, 2013

(51) Int. Cl.
*H04W 48/16* (2009.01)
*H04L 29/12* (2006.01)
(Continued)

(52) U.S. Cl.
CPC ......... *H04W 48/16* (2013.01); *H04L 61/3095* (2013.01); *H04L 65/1016* (2013.01);
(Continued)

(58) Field of Classification Search
CPC ......... H04W 48/16; H04W 4/00; H04W 4/01; H04W 4/005; H04L 61/3095;
(Continued)

(56) References Cited

U.S. PATENT DOCUMENTS 7,609,700 B1 * 10/2009 Ying ..................... H04L 65/80
370/260
2008/0080480 A1 * 4/2008 Buckley ................. H04L 12/66
370/352
(Continued)

FOREIGN PATENT DOCUMENTS

WO    WO 2008/128873 A1    10/2008
WO    WO 2009/092115 A2    1/2009
(Continued)

OTHER PUBLICATIONS

International Search Report and Written Opinion of the International Searching Authority, International Application No. PCT/EP2010/062751, dated Sep. 6, 2011.
(Continued)

*Primary Examiner* — Hoang-Chuong Vu
(74) *Attorney, Agent, or Firm* — Sage Patent Group (57) ABSTRACT

An IMS (IP Multimedia Subsystem) network contains at least one of (A) a discovery function (2) for providing ISIM (IP Multimedia Subscriber Identity Module) discovery information to the mobile device (1) and (B) a provisioning function (2, 5, 6) for providing, in response to a request from a mobile device, an ISIM to the mobile device (1). Where the IMS network contains the discovery function, the discovery function is adapted to provide ISIM discovery information to the mobile device, and where the IMS network contains the provisioning function, the provisioning function is adapted to provide an ISIM to the mobile device (1).

25 Claims, 6 Drawing Sheets

Generic network architecture for remote provisioning of ISIM credentials (51) Int. Cl.
  *H04W 4/00* (2009.01)
  *H04L 29/06* (2006.01)
  *H04L 29/08* (2006.01)

(52) U.S. Cl.
  CPC .......... *H04L 65/1073* (2013.01); *H04L 67/12* (2013.01); *H04W 4/00* (2013.01); *H04W 4/005* (2013.01)

(58) Field of Classification Search
  CPC ............. H04L 65/1016; H04L 65/1073; H04L 29/06551; H04L 41/0806
  See application file for complete search history.

(56) References Cited

U.S. PATENT DOCUMENTS

| | | | |
|---|---|---|---|
| 2008/0287134 A1* | 11/2008 | Catovic | H04W 68/02 455/445 |
| 2009/0061877 A1* | 3/2009 | Gallagher | H04W 76/022 455/436 |
| 2009/0191857 A1 | 7/2009 | Horn et al. | |
| 2009/0205028 A1* | 8/2009 | Smeets et al. | 726/6 |
| 2009/0217348 A1* | 8/2009 | Salmela | H04L 63/08 726/2 |
| 2009/0253409 A1* | 10/2009 | Slavov et al. | 455/411 |
| 2010/0106967 A1* | 4/2010 | Johansson et al. | 713/158 |
| 2010/0312832 A1* | 12/2010 | Allen | H04L 65/1016 709/204 |
| 2011/0055565 A1* | 3/2011 | Murakami et al. | 713/168 |
| 2011/0246624 A1* | 10/2011 | Kato | H04L 65/1016 709/219 |
| 2011/0265158 A1* | 10/2011 | Cha et al. | 726/6 |
| 2012/0096162 A1* | 4/2012 | Cecilia Torralba | H04W 4/001 709/225 |
| 2013/0185560 A1* | 7/2013 | Eld | H04L 9/12 713/168 |

FOREIGN PATENT DOCUMENTS

| | | |
|---|---|---|
| WO | WO 2009/083034 A1 | 7/2009 |
| WO | WO 2009/098130 A2 | 8/2009 |

OTHER PUBLICATIONS

Written Opinion of the International Preliminary Examining Authority, International Application No. PCT/EP2010/062751, dated Oct. 9, 2012.

International Preliminary Report on Patentability, International Application No. PCT/EP2010/062751, dated Dec. 17, 2012.

3$^{rd}$ Generation Partnership Project, Technical Report, 3$^{rd}$ Generation Partnership Project; Technical Specification Group Services and System Aspects; Feasibility study on the security aspects of remote provisioning and change of subscription for Machine to Machine (M2M) equipment (Release 9), 3GPP TR 33.812 V9.2.0, Jun. 22, 2010, pp. 1-87 (sections 1-5) (XP050441986).

* cited by examiner

Figure 1 - Generic network architecture for remote provisioning of ISIM credentials Figure 2 - Discovery – the TRE receives the address of the Provisioning Function holding the IMS credentials from the Discovery Function

Figure 3

Figure 4 - Downloading new ISIM for Device B using existing IMS subscription.

DOWNLOADABLE ISIM

CROSS REFERENCE TO RELATED APPLICATION

This application is a 35 U.S.C. §371 national stage application of PCT International Application No. PCT/EP2010/062751, filed on 31 Aug. 2010, the disclosure and content of which is incorporated by reference herein in its entirety. The above-referenced PCT International Application was published in the English language as International Publication No. WO 2012/028179 A1 on 8 Mar. 2012.

TECHNICAL FIELD

This application relates to the remote provisioning of a mobile device with a Subscriber Identity Module such as an IP Multimedia Services Identity Module.

BACKGROUND

An entity who has subscribed for the provision of services to a mobile device such as a mobile telephone is required to have an associated Subscriber Identity Module (SIM), which identifies the subscriber and the services to which the subscriber is entitled. The type of SIM required depends on the particular mobile device and the network over which it is to be used, for example a mobile device operating over the IP Multimedia Subsystem (IMS) requires an IP Multimedia Services Identity Module (ISIM), whereas a mobile device operating over the Universal Mobile Telecommunications System (UMTS) requires a Universal Subscriber Identity Module (USIM)

When a mobile device is purchased it is necessary to provide the device with a SIM before the device can be used. The process is referred to a "provisioning" the device. Currently, the provisioning process is normally carried out manually, for example by sales personnel when the mobile device is purchased, or with a partial degree of automation, eg via a Point of Sale (PoS). However, the large number of mobile devices that are sold make manual or part-manual provisioning processes undesirable. SIP-based M2M (machine to machine) and CCE (connected consumer electronics) devices—including gateways, proxies and Back-2-Back User Agents (B2BUA)—are likely to face a similar problem when handling subscription credentials. In a world of billions of devices, the currently established manual or semi-automated procedures for handling IMS credentials in Universal Integrated Circuit Cards (UICC) are non-efficient, non-scalable and non-user friendly, preventing a wider acceptance and penetration of the IMS services and applications.

For example, a person may purchase one or more IMS devices abroad, or take out a subscription to one or more IMS services while abroad, and would like to enjoy the IMS applications as soon as possible without waiting to come home and going to a retailer to obtain an ISIM. A subscriber may also add new IMS devices or services to his/her subscription or even change IMS operator after some years due to moving.

There is a need for a solution that allows remote management of IMS credentials for various M2M and CCE business models where minimal or no human intervention is needed for scenarios where the user is actively involved in the management process.

WO 2009/098130 and WO 2008/128873 propose a downloadable USIM (DLUSIM), alternatively referred to as Machine Communication Identity Module (MCIM). We will use the terms MCIM and DLUSIM interchangeably in the rest of this document.

There are two aspects considered in the MCIM/DLUSIM architecture: terminal and network aspects. On the terminal side, the traditional UICC is replaced with the more generic Trusted (Execution) Environment. On the network side, two new network nodes/technical functions are introduced: the Discovery Function and the Provisioning Function. The former allows the M2M equipment to discover the selected home operator and latter enables the download of the subscription credentials.

MCIM/DLUSIM can be seen as a high-level framework, and as such it can be used for remote provisioning of ISIM applications as well.

The TRusted Environment (TRE) in the device provides some hardware and software protection for the provisioning, storage, execution and management of applications such as USIM or ISIM. The TRE might be a completely separate module (e.g. UICC or TPM) or it might share memory and CPU etc. with the device (e.g. ARM's TrustZone).

Since it might be possible to move the TRE between devices (as in the UICC case) a subscription is bound to the TRE identity rather than the device identity. Furthermore, since the device is not fully trusted, decryption of the IMS credentials must be performed inside the TRE, and not in the hosting device. As the TRE becomes an integral part of the device, in the rest of this document we will assume that the device is TRE-equipped. Hence, when referring to ISIM requests and ISIM data sent from/to the device, is meant that request or data are sent from/to the TRE of the device. Where necessary for clarity of explanation, the difference between the TRE and the hosting device will be mentioned.

SUMMARY

A first aspect of the invention provides an IMS (IP Multimedia Subsystem) network. The network contains at least one of (1) a discovery function for providing ISIM (IP Multimedia Subscriber Identity Module) discovery information to the mobile device and (2) a provisioning function for providing, in response to a request from a mobile device, an ISIM to the mobile device.

In the present application, a "subscription" refers to an arrangement or contract with a service provider for the provision of services. A subscription is associated with a Subscriber Identity Module (SIM) rather than with a specific mobile device, and services under the subscription will be provided to a mobile device, such as a mobile telephone, that is currently associated with the SIM (for example the SIM may be encoded onto a SIM card, and services under the subscription are provided to a mobile device in which the SIM card is currently located, provided that the mobile device has the required technical capability to perform the services). The mobile device to which services are provided under a particular subscription may change from time to time.

The term "subscription" as used herein is intended to cover both an arrangement in which repeated payments are made for the provision of the services under the subscription and an arrangement in which a "one-off" payment is made for the provision of the services under the subscription.

A subscription is associated with a "subscriber", which is the entity who is responsible for payment of costs incurred through using the services provided under the subscription (and will generally but not necessarily also be the entity who set up the subscription with the service provider).

A subscription is also associated with a "user", which is the entity (generally a person) who consumes services provided under the subscription. In principle a subscription may have more than one "user" (for example where one member of a family is the subscriber, all family members may potentially be users of the subscription); the description of the invention will assume there is only one user for simplicity but the application is not limited to the case of there being only one user). In many cases the subscriber and the user of the subscription will be the same person, eg the person who is the normal user of the mobile device that is currently associated with the subscription. However, the subscriber and the user may be different entities—for example, the subscriber may be a company and an employee of the company may be the user who consumes services provided under the subscription.

For a subscription there will be a mobile device that is "associated" with the subscription, in that the SIM of the subscription is associated with that mobile device in such a way that services under the subscription are delivered to that mobile device. For example, the mobile device "associated" with the subscription may be the mobile device that currently contains the SIM card for the subscription. The mobile device associated with the subscription may change over time.

IMS devices are manufactured with a Provisioning ISIM, optionally GBA-enabled, which allows limited registration to an IMS network. Using said ISIM and network's IMS services, the real IMS home network is discovered and the corresponding IMS credentials are downloaded, provisioned and activated. Downloaded IMS credentials are provisioned in the Trusted Environment of the device, creating a complete operational ISIM. For increased security, PKI and/or GBA can be used to protect the IMS credentials during transfer and installation.

The invention enables use of IMS infrastructure and services for discovery and provisioning purposes. This provides better scalability of discovery and provisioning compared to manual or semi-automated procedures, so making it possible to handle discovery and provisioning for large numbers of devices, and also provides operating efficiencies owing to the use of automated remote management procedures during the device life cycle. Furthermore, the invention should shorten the time required before a user can start using a new mobile device, and so provide an improved user experience.

In a case where the IMS network contains the discovery function, the IMS network may be adapted to detect an IMS registered device that requires ISIM provisioning and to provide discovery information identifying a provisioning function for the mobile device.

In a case where the IMS network contains the discovery function, the IMS network may alternatively be adapted to provide discovery information identifying a provisioning function for the mobile device in response to an ISIM subscription provisioning request from the user of the mobile device, or in response to an ISIM subscription provisioning request from the mobile device or the device's TRE.

In a case where the IMS network contains the discovery function, the IMS network may be adapted to provide discovery information identifying one of: a provisioning function in the IMS network; a provisioning function in another IMS network; and a provisioning function in a third party network.

In a case where the IMS network contains the discovery function, the discovery function may be adapted to provide one or both of ISIM discovery information and USIM (Universal Subscriber Identity Module) discovery information to the mobile device or the device's TRE.

In a case where the IMS network contains the provisioning function, the provisioning function may be adapted to provide one or both of an ISIM and a USIM to the mobile device or the device's TRE.

A second aspect of the invention provides a method of ISIM provisioning a mobile device, eg provisioning the TRE of a mobile device. The method comprises at least one of:
  (1) sending, from an IMS (IP Multimedia Subsystem) network, discovery information identifying an ISIM (IP Multimedia Subscriber Identity Module) provisioning function for the mobile device; and
  (2) in response to a request received at an IMS network from a mobile device, sending, from the IMS network, an ISIM.

The discovery information identifying an ISIM provisioning function for the mobile device may be sent upon one of: detecting an IMS registered device that requires ISIM provisioning discovery information; receiving an ISIM provisioning request from the mobile device or from the user of the mobile device; and receiving an ISIM provisioning request from the mobile device or from the device's TRE.

The IMS network may send to the mobile device discovery information identifying the IMS network as the ISIM provisioning function. In this case, the method may further comprise receiving, at the IMS network, a request for an ISIM from the mobile device or from the device's TRE; and sending an ISIM from the IMS network to the mobile device or to the device's TRE.

Alternatively, the IMS network may send to the mobile device or the device's TRE discovery information identifying another IMS network as the ISIM provisioning function, or it may send discovery information identifying a third party network as the ISIM provisioning function.

In a case where the IMS network contains the discovery function, the IMS network may send one or both of ISIM discovery information and USIM (Universal Subscriber Identity Module) discovery information to the mobile device or the device's TRE.

In a case where the IMS network contains the provisioning function, the IMS network may send, in response to a request, at least one of an ISIM and a USIM (Universal Subscriber Identity Module) to the mobile device or the device's TRE.

A further aspect of the invention provides an IMS (IP Multimedia Subsystem) network adapted to receive a communication from a first mobile device, the first mobile device having an IMS registration, and to determine the IMS identity of the subscriber behind the first mobile device. The method further includes receiving, from the first mobile device, information identifying a second mobile device; and creating an ISIM for the second mobile device. This provides a simplified ISIM provisioning process for provisioning an additional device using an existing IMS subscription.

By the term "subscriber behind the [first] mobile device" is meant the entity who is the owner of the subscription for the provision of services to the SIM currently associated with the [first] mobile device.

The IMS network may be further adapted to send the ISIM created for the second mobile device to the second mobile device or the device's TRE.

A further aspect of the invention provides a method of provisioning a mobile device with an IMS (IP Multimedia Subsystem) subscription, the method comprising receiving, at an IMS network, a communication from a first mobile device having an IMS registration, and determining, the IMS identity of the subscriber behind the first mobile device. The method then comprises receiving, at the IMS network, information from the first mobile device identifying a second mobile device, and creating an ISIM (IP Multimedia Subscriber Identity Module) for the second mobile device or for the device's TRE.

The method may further comprise the IMS network sending, to the second mobile device or to the device's TRE, the ISIM created for the second mobile device.

A further aspect of the invention provides a method of provisioning a mobile device with an IMS (IP Multimedia Subsystem) subscription, the method comprising: establishing communication between a first mobile device and an IMS network, the first device having an IMS registration. Information identifying a second mobile device, the second mobile device being associated with the subscriber behind the first mobile device, is then sent from the first mobile device to the IMS network, and an ISIM (IP Multimedia Subscriber Identity Module) is created for the second mobile device.

The user of the first mobile device may establish communication with the IMS network via a web portal.

A further aspect of the invention provides a method of provisioning a mobile device with an IMS (IP Multimedia Subsystem) subscription. Discovery information is input into a mobile device, the discovery information identifying an ISIM provisioning function device for the mobile device or the device's TRE. A provisioning request is sent from the mobile device to the ISIM provisioning function identified in the discovery information, and an ISIM is provisioned at the mobile device or at the device's TRE.

A further aspect of the invention provides an IMS (IP Multimedia Subsystem) network element. The network element contains at least one of (1) a discovery function for providing ISIM (IP Multimedia Subscriber Identity Module) discovery information to the mobile device and (2) a provisioning function for providing, in response to a request from a mobile device, an ISIM to the mobile device.

The IMS network element may contain the discovery function, and the IMS network element may be adapted to detect an IMS registered device that requires ISIM provisioning and to provide discovery information identifying a provisioning function for the mobile device.

The IMS network element may contain the discovery function, and the IMS network element may be adapted to provide, in response to an ISIM subscription provisioning request from the user, discovery information identifying a provisioning function for the mobile device.

The IMS network element may contain the discovery function, and the IMS network element may be adapted to provide, in response to an ISIM subscription provisioning request from the mobile device, discovery information identifying a provisioning function for the mobile device.

The IMS network element may contain the discovery function, and the IMS network element may be adapted to provide discovery information identifying at least one of: a provisioning function in the IMS network; a provisioning function in another IMS network; and a provisioning function in a third party network.

The IMS network element may contain the discovery function, and the IMS network element may be adapted to provide one or both of ISIM discovery information and USIM (Universal Subscriber Identity Module) discovery information to the mobile device.

The IMS network element may contain the provisioning function, and the provisioning function may be adapted to provide one or both of an ISIM and a USIM to the mobile device.

BRIEF DESCRIPTION OF THE DRAWINGS

Preferred embodiments of the present invention will be described by way of example with reference to the accompanying figures in which.

DETAILED DESCRIPTION

Figure 1:
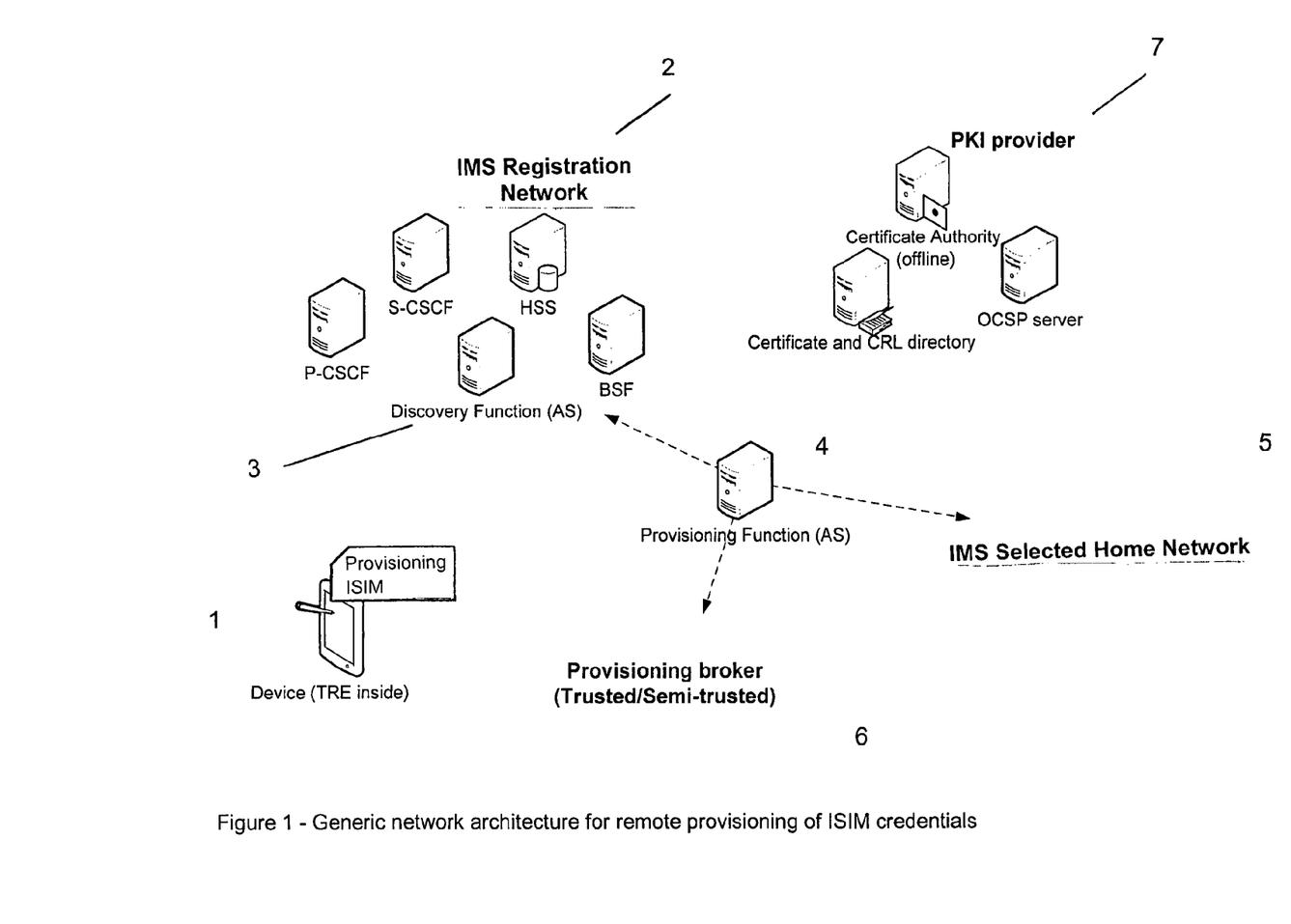
FIG. 1 illustrates a generic network architecture for remote provisioning of ISIM credentials.

FIG. 1 illustrates a generic architecture for remote management of IMS credentials. A mobile device 1, for example, a newly-purchased mobile device, requires to be provisioned with an ISIM. The TRE of the mobile device 1 is pre-provisioned with a Provisioning ISIM (with the term "Provisioning ISIM" denoting an ISIM that is used for provisioning purposes only) issued by an Registration Network 2. The Registration Network acts as a temporary IMS home network during ISIM provisioning.

The Registration Network 2 may further contain one or more of a Proxy-Call Session Control Function (P-CSCF), a Serving-Call Session Control Function (S-CSCF), a Home Subscriber Server (HSS) and a Bootstrapping Server Function (BSF).

In FIG. 1 the Registration Network 2 is an IMS Registration Network, but the Registration Network 2 may alternatively be another Session Initiation Protocol (SIP)-based network. Moreover, the components of the Registration Network 2 may differ from those shown in FIG. 1.

The IMS Selected Home Network is the Network who issues the IMS credentials. The subscriber signs a subscription contract with the IMS Selected Home Network and binds the subscription to a certain TRE by specifying a TRE identity. (The Provisioning ISIM IP Multimedia Public Identity (IMPU) or the ISIM IP Multimedia Private Identity (IMPI) could be used as a TRE identity). The IMPU or IMPI can be printed on the outside of the device or be available via some Near Field Communication technology such as RFID or Bluetooth.)

For authentication and confidentiality of the IMS credentials provided to the Mobile Device 1 it is desirable to use encryption such as GBA and/or PKI.

The GBA infrastructure consists of the BSF and the HSS (which contains the Provisioning ISIM Ks key)

The PKI infrastructure, shown generally as the PKI provider 7 in FIG. 1, consists of: an offline Certificate Authority which issues server/client certificates; a public directory containing the certificates and certificate revocation lists (CRLs); and an Online Certificate Status Protocol (OCSP) server.

Besides the IMS infrastructure and the GBA and/or PKI infrastructure, the architecture of FIG. 1 consists of one or both of the following two functions, which are based on functions described in 3GPP TR 33.812, "Feasibility Study on Remote Management of USIM Application on M2M Equipment":
a Discovery Function 3—this provides the mobile device 1 with the address/identity of the Provisioning Function
a Provisioning Function 4—this manages the download of the IMS credentials (the "ISIM blob") to the mobile device 1.

The Discovery Function 3 is provided in the IMS Registration Network 2, and may be implemented by an IMS application server (AS). During the discovery process described below, the Discovery Function 3 provides the mobile device 1 with the address/identity of a selected IMS Home Network having a Provisioning Function 4 that will issue the mobile device 1 with an operational ISIM.

The provisioning function 4 may be implemented by an application server (AS). As is indicated in FIG. 1, the provisioning function 4 may be located within the IMS Registration Network 2—that is, the IMS Registration Network 2 in this embodiment provides both the Discovery Function 3 and the Provisioning Function 4 and so acts also as the IMS Home Network. Thus, in the discovery process the IMS Registration Network 2 will provide the Mobile Device 1 with information that identifies the IMS Registration Network 2 as the IMS Selected Home Network containing the provisioning function 4.

Alternatively, the provisioning function 4 may be located within an IMS Selected Home Network that is separate from the IMS Registration Network 2, as indicated in FIG. 1 by the IMS Selected Home Network 5. In this embodiment, in the discovery process the IMS Registration Network 2 will provide the Mobile Device 1 with information that identifies the IMS Selected Home Network 5 as containing the provisioning function 4.

As a further alternative the provisioning function 4 may be located within a third party Provisioning Broker 6, that is, the provisioning function 4 can be regarded as being "outsourced" to the Provisioning Broker 6. In this embodiment, in the discovery process the IMS Registration Network 2 will provide the Mobile Device 1 with information that identifies the Provisioning Broker 6 as containing the provisioning function 4.

The discovery and provisioning processes will now be described in more detail.

Discovery

Figure 2:
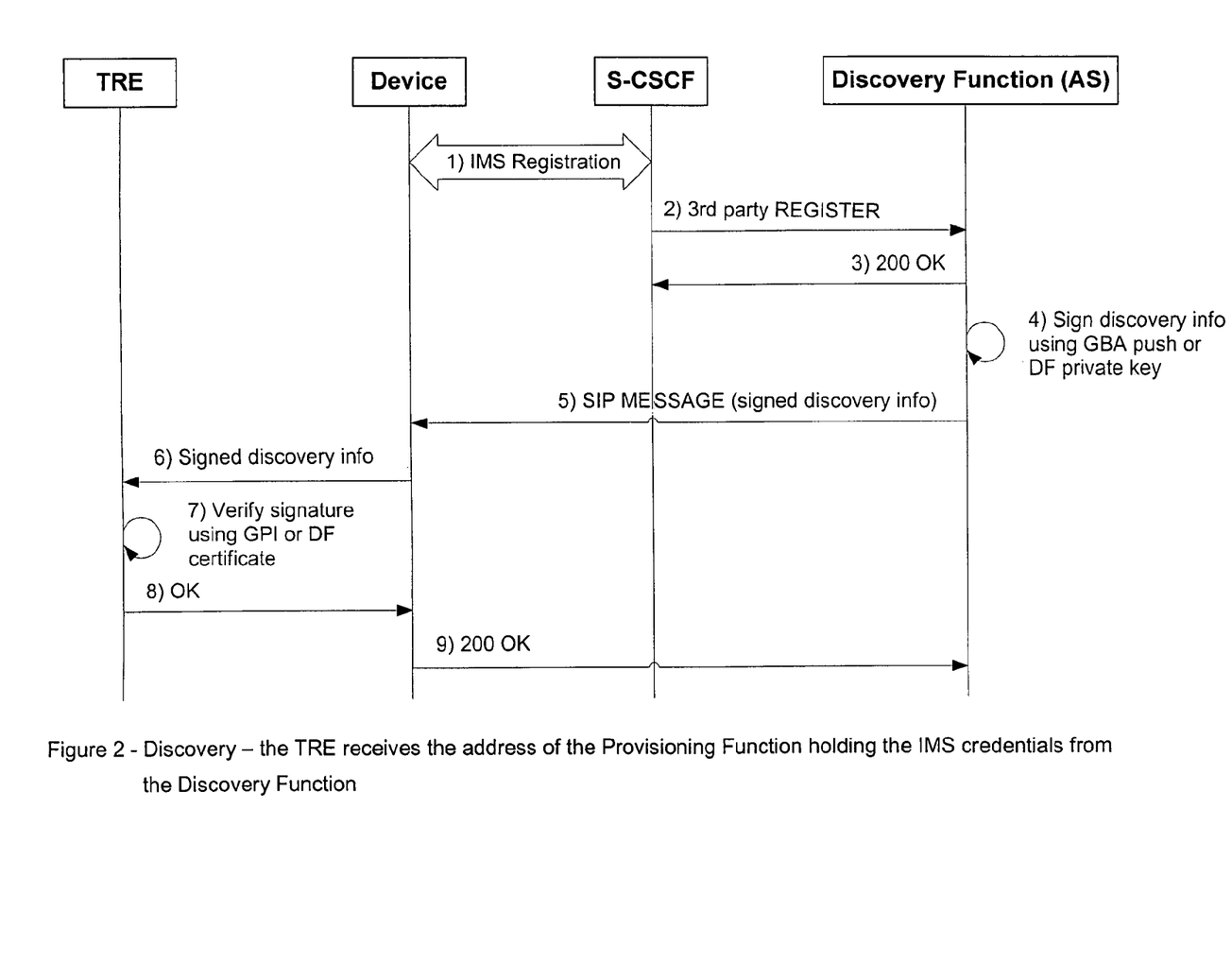
FIG. 2 illustrates the principal steps of discovery process according to the present invention.

FIG. 2 illustrates principal steps of one implementation of the discovery process. In this implementation the Discovery Function 3 is an IMS Application Server, so that the discovery information is pushed to the mobile device 1 at IMS registration.

The method of FIG. 2 assumes that the Discovery Function 3 has already been pre-provisioned to include the mobile device 1, i.e. the TRE identity of the mobile device 1 maps to the correct discovery information for the mobile device subscription.

At step 1 of FIG. 2, the mobile device 1 registers to the IMS Registration Network 2, specifically to the S-CSCF of the IMS Registration Network 2, using the Provisioning ISIM contained in the TRE of the mobile device 1 (the required signalling between the mobile device 1 and the TRE of the mobile device 1 is not shown for simplicity). This may happen automatically—for example a device may be produced and programmed to register automatically upon power-on. Alternatively, the registration step may be initiated by a user.

When the registration of the mobile device 1 to the IMS Registration Network 2 is complete the S-CSCF of the IMS Registration Network 2 evaluates the initial filter criteria contained in information sent by the mobile device 1, based on the IMS subscriber identity and pre-provisioned policies in the IMS Network 2. One of the initial filter criteria indicates that the S-CSCF should send a third-party REGISTER request to the Discovery Function. Accordingly, at step 2 of FIG. 2, the S-CSCF sends a third-party REGISTER request to the Discovery Function 3 that identifies the mobile device 1, for example by including its TRE identity.

At step 3 of FIG. 2, the Discovery Function acknowledges the REGISTER message by sending a 200 OK message to the S-CSCF.

At step 4 of FIG. 2, the Discovery Function retrieves the discovery information for the mobile device. By "discovery information" is meant information that gives the address/identity of the provisioning function for the mobile device, i.e. at step 4 the Discovery Function retrieves information that gives the address/identity of the provisioning function for the mobile device. It then signs the discovery information using e.g. S/MIME or Secure XML. To ensure integrity the signing key is either Ks_NAF (obtained via GBA Push) or the Discovery Function's private key. Although not shown in FIG. 2, the discovery information may additionally be protected with confidentiality using GBA push or the TRE public key or digital certificate.

At step 5 of FIG. 2, the signed discovery information is included in a SIP MESSAGE that is sent from the S-CSCF to the mobile device 1 using an appropriate SIP method and IMS service, e.g. SIP Push.

At step 6 of FIG. 2, the mobile device removes the SIP headers from the message it receives from the S-CSCF, and forwards the signed discovery information to the TRE of the mobile device. Alternatively (not shown in FIG. 2), the SIP message may also be sent as such to the TRE that handles SIP signalling.

At step 7 of FIG. 2, the TRE verifies the signature of the signed discovery information it has received. This involves:
a. Calculating Ks_NAF from the included GPI (GBA Push Info); or
b. Verifying the signature and revocation status of the included certificate.

If the signature was valid, the TRE stores the discovery information and sends an OK message to the Device at step 8.

At step 9 the device acknowledges the SIP MESSAGE sent in step 5, by sending a 200 OK message to the discovery function.

It should be noted that if the underlying IMS networks are trusted (see RFC 3325 "Private Extensions to the Session Initiation Protocol (SIP) for Asserted Identity within Trusted Networks"), it is not necessary to sign the discovery information at step 4 since the SIP message is automatically authenticated via the P-Asserted-Identity field in the SIP MESSAGE header.

The result of the discovery process of FIG. 2 is that the TRE of the mobile device 1 now contains information giving the address/identity of the provisioning function for the mobile device 1.

It should be understood that the method of FIG. 2 is capable of variations. For example the described method would apply where the IMS network is adapted to detect an IMS registered device that requires ISIM provisioning and to initiate the process of providing discovery information upon detections of the device. The method may alternatively be implemented by the process of providing discovery information being initiated upon receipt of an ISIM subscription provisioning request from the user, or upon receipt of an ISIM subscription provisioning request sent from the mobile device without requiring any action by the user (for example a request may be sent automatically upon start up of the mobile device for the first time).

It should further be noted that the invention may not require a discovery process to "push" discovery information to the mobile device such as the discovery process of FIG. 2. For example, the TRE of the mobile device may alternatively be provisioned with the address of a Discovery Function 3, and the mobile device may be configured to contact that Discovery Function 3 to obtain the discovery information, i.e. the address/identity of the provisioning function for the mobile device 1. In this case, the device "pulls" the discovery information instead of the discovery information being provided by a discovery process that "pushes" discovery information to the device.

It should also be noted that the invention may not require a discovery process such as that of FIG. 2, as there are cases when the Discovery Function 3 is not used. Depending on the business model, and assuming the device has a human interface (e.g. keyboard/display, touch screen), an alternative is when the user of the mobile device (who, as noted above, may be a person who is the subscriber or who may be a person associated with the subscriber such as an employee in a case where the subscriber is a company) obtains the discovery information (containing the address/identity of the provisioning function for mobile device) either directly or via a directory service (for example via a web portal).

Figure 8:
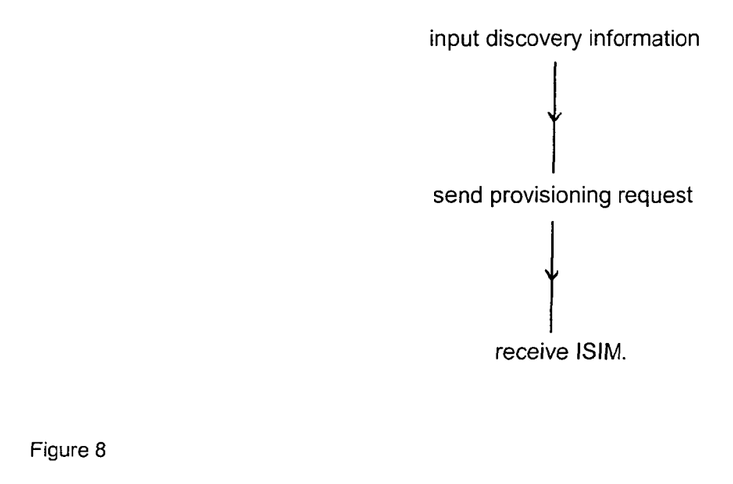
FIG. 8 is a block flow diagram of a method according to the present invention.

FIG. 8 illustrates the principal steps of such a method which does not include a discovery process. Initially, the user inputs discovery information at step 1 of FIG. 8, for example into the mobile device using its keypad or screen. A provisioning request is then sent to the appropriate provisioning function identified in the input discovery information, at step 2 of FIG. 8. For example, the user may visit a web portal using the mobile device and find a link (eg a URL) to the provisioning function, and this link would constitute discovery information. The user may then follow the link (for example "click" on the link) to start the process of provisioning the mobile device. Alternatively, as a further example, the user may input the discovery information in a telephone call made from the mobile device. An ISIM is then received from the provisioning function, at step 3 of FIG. 8.

In principle it would be possible for the user to obtain the discovery information without using the mobile device, for example by using their PC or laptop computer to visit a web portal. However, this would require an additional process of verifying the identity of the person visiting the web portal, and it is therefore desirable that the user inputs discovery information via the mobile device since, provided that no theft or mis-use of the mobile device has occurred, this provides verification of the identity of the user.

Provisioning

As mentioned above, the IMS Selected Home Network 5 could either maintain the Provisioning Function itself, the IMS Registration Network 2 could either maintain the Provisioning Function, or the IMS Selected Home Network 5 could outsource Provisioning Function to a third party, a so called provisioning broker. A provisioning broker is said to be "trusted" if it could potentially learn the contents of the ISIM blob although not required for ISIM provisioning purposes. Otherwise the broker is said to be "semi-trusted" for provisioning purposes only.

The Provisioning Function may be implemented as a server, for example using an existing provisioning protocol such as OMA DM, OTA or TR069 or use a DLISIM specific solution.

Figure 3:
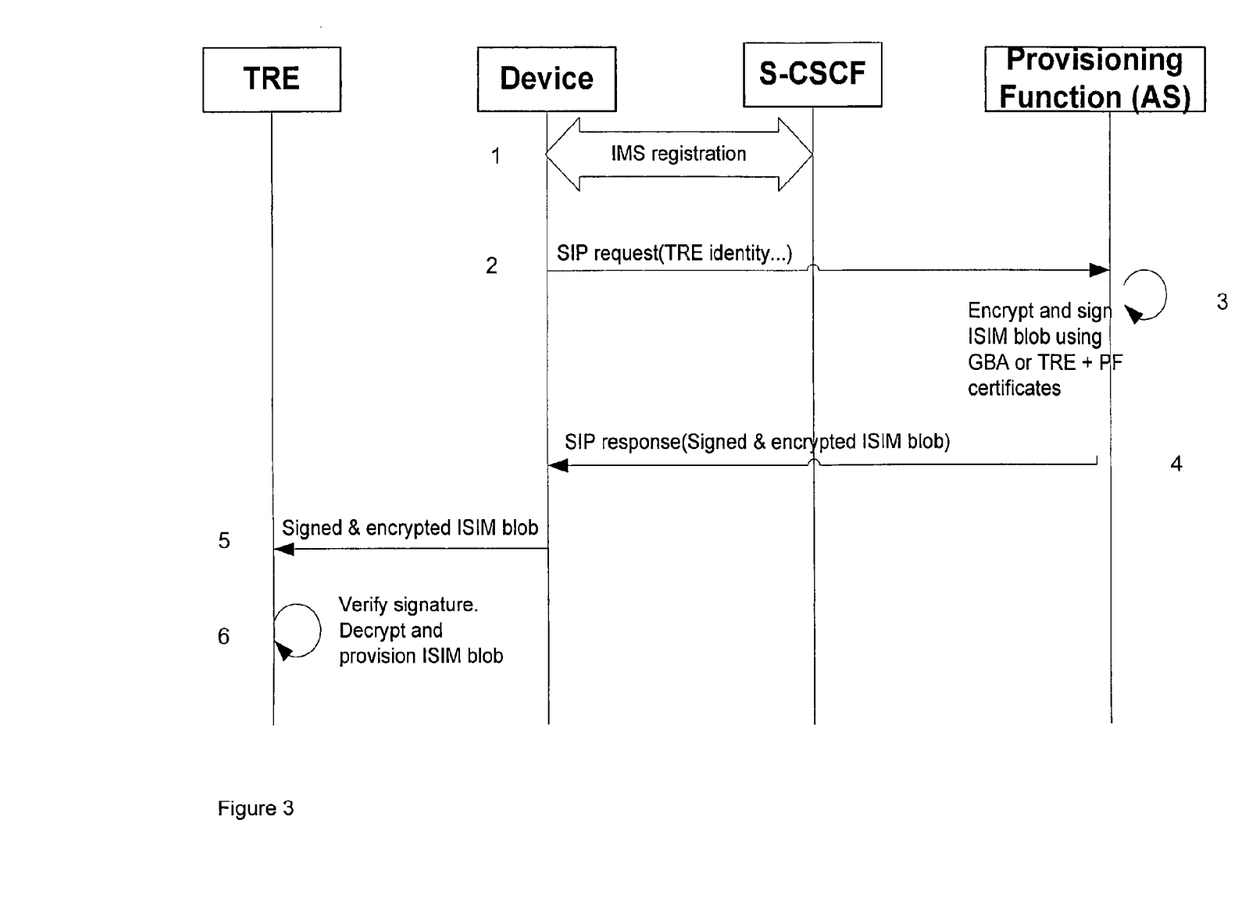
FIG. 3 illustrates the principal steps of provisioning process according to the present invention.

FIG. 3 illustrates the principal steps of a provisioning process according to an embodiment of the present invention. The method assumes that the mobile device has already registered to an IMS network that allows contacting the Provision Function 3, for example the IMS network 2, 5 or 6 of FIG. 1. The method of FIG. 2 also assumes that the Provisioning Function 3 has already been pre-provisioned to include the mobile device 1, i.e. the TRE identity of the mobile device 1 maps to the correct IMS credentials (or "IMS blob") discovery information for the mobile device.

At step 1 of FIG. 3, the mobile device 1 registers to the Network that allows access to the provisioning function (specifically to the S-CSCF of that network), using the Provisioning ISIM contained in the TRE of the mobile device 1. (As noted above the Network containing the provisioning function may be the IMS Registration Network 2, the IMS Home Network 5, or a third party provisioning Network.) At step 2 of FIG. 3, the mobile device then sends a request for an ISIM to the provisioning function.

Next, at step 3 of FIG. 3, an ISIM blob is generated for the mobile device, and the ISIM blob is encrypted and signed using Ks_NAF_inner (obtained via GBA Push) and e.g. S/MIME or Secure XML. If the provisioning function is provided by a provisioning broker that is not fully trusted, the encryption and signing is performed by the IMS Selected Home Network.

At step 4 of FIG. 3, the signed and encrypted ISIM blob is included in a SIP message that is sent from the provisioning function to the mobile device 1 using an appropriate SIP method.

At step 5 of FIG. 3, the mobile device removes the SIP headers from the message it receives from the provisioning function, and forwards the signed ISIM blob to the TRE of the mobile device. Alternatively, not shown in FIG. 3, the SIP message containing the ISIM blob may go directly to the TRE of the mobile device. This may occur when the TRE can handle SIP messages.

At step 6 of FIG. 3, the TRE verifies the signature of the signed discovery information it has received, for example in the manner described with reference to step 7 of FIG. 2.

If the signature was valid, the TRE decrypts the ISIM blob, and provisions the mobile device with the received ISIM.

Preferably, once the mobile device has been successfully provisioned the TRE may send an OK message to the Device, which in turns sends an OK message to the provisioning function; these messages are omitted from FIG. 3 for clarity.

The mobile device 1 is now available for operational use.

Figure 5:
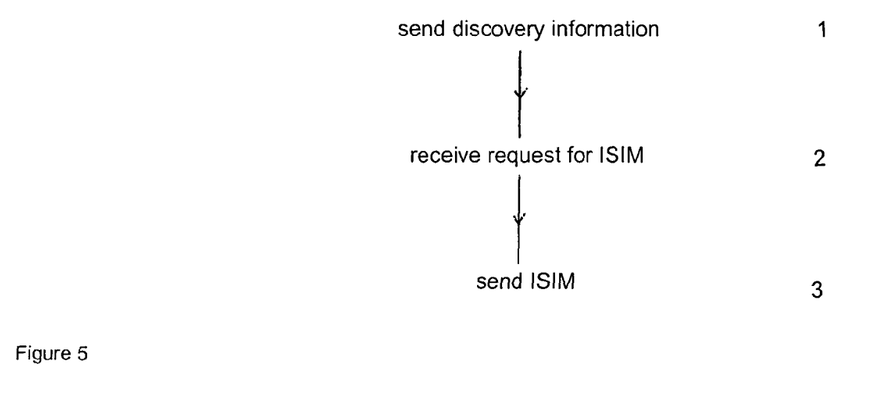
FIG. 5 is a block flow diagram of a method according to the present invention.

As noted above, the Provisioning Function 4 may be located in the IMS Registration Network 2. FIG. 5 is a block flow diagram illustrating the principal steps carried out by the IMS Registration Network 2 in this case. Initially, at step 1, the IMS Registration Network sends discovery information to the mobile device, in response to an ISIM provisioning request from the mobile device or from the user of the mobile device.

Step 1 of FIG. 5 corresponds generally to steps 4 and 5 of FIG. 2.

Next, at step 2 of FIG. 5, the IMS Registration Network receives a request from the mobile device for an ISIM (this corresponds generally to step 2 of FIG. 3). In response, at step 3 of FIG. 5, the IMS Registration Network sends an ISIM to the mobile device (this corresponds generally to steps 3 and 4 of FIG. 3).

Figure 4:
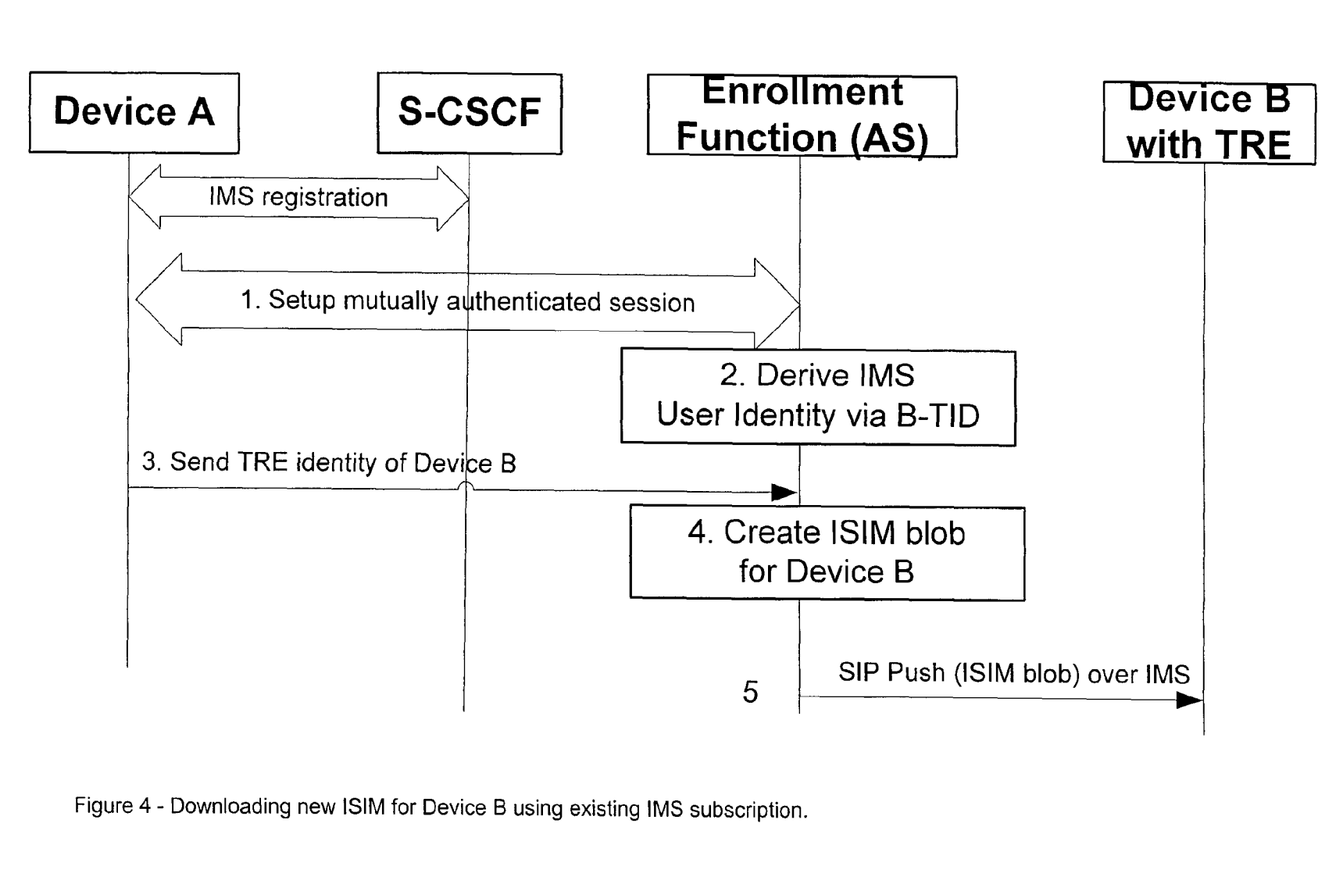
FIG. 4 illustrates the principal steps of another provisioning process according to the present invention.

FIG. 4 shows the principal steps of a provisioning process according to another embodiment of the invention. The method of FIG. 4 applies to the case where a user has an existing IMS subscription or is associated with is a subscriber who has an existing IMS subscription, and allows the user to provision an additional IMS mobile device with a new ISIM using an optimized provisioning process.

The method of FIG. 1 assumes that an existing mobile device ("device A") has already been registered to IMS, as denoted by the arrow labeled "IMS Registration" in FIG. 4. If the user of device A wishes to provision a second mobile device ("device B"), at step 1 of FIG. 4 a mutually authenticated channel is established between Device A and the IMS Network's Enrollment Function (NEF). This channel to the NEF (which may be implemented as an IMS application server) can be established via the IMS infrastructure using an appropriate SIP method and IMS security. The NEF may normally be placed at the selected home operator who would need to handle internally a "push" provisioning process. Alternatively, the NEF could act also as a discovery service that pushes the discovery information to the device, that in turn would contact the provisioning function as previously described.

At step 2 of FIG. 4 the Enrollment Function derives the IMS identity of the subscriber behind the mobile device A via the asserted-identity (for example B-TID) provided by the user during establishment of the channel between Device A and the Enrollment Function.

At step 3 of FIG. 4 the TRE identity of Device B is sent over the channel to the Enrollment Function. This may be done, for example, by the user manually entering the TRE into Device A and sending the TRE from Device A to the Enrollment Function—for example the TRE identity of Device B could be printed on Device B and entered through Device A's keypad or other human interface. Alternatively, the TRE of Device B could be read out from Device B, for example using some Near Field Communication technology such as RFID, and sent to the Enrollment Function via Device A.

At step 4 of FIG. 4, the Enrollment Function generates, based on the received TRE for device B, a specific ISIM blob for Device B. At step 5, the ISIM blob for Device B is pushed to Device B using an appropriate SIP or IMS method, e.g. SIP Push. When the ISIM blob is received at Device B, Device B may then be provisioned as described with reference to steps 5 and 6 of FIG. 3. The provisioning process may be done directly onto Device B or via Device A.

The method of FIG. 4 is one possible embodiment of provisioning an additional device, but variations on this are possible. For example, the TRE identity of device B may be communicated to the Enrollment Function by a method that does not involve transmission of a message from Device A—as an example, a web portal may be provided into which the user can enter the TRE identity of Device B, or the TRE identity of Device B may be sent using an SMS message from Device A whereby the body of the message contains the TRE identity of Device B. An alternative to step 5 would be to use other push mechanisms such as WAP Push or HTTP Push.

Figure 7:
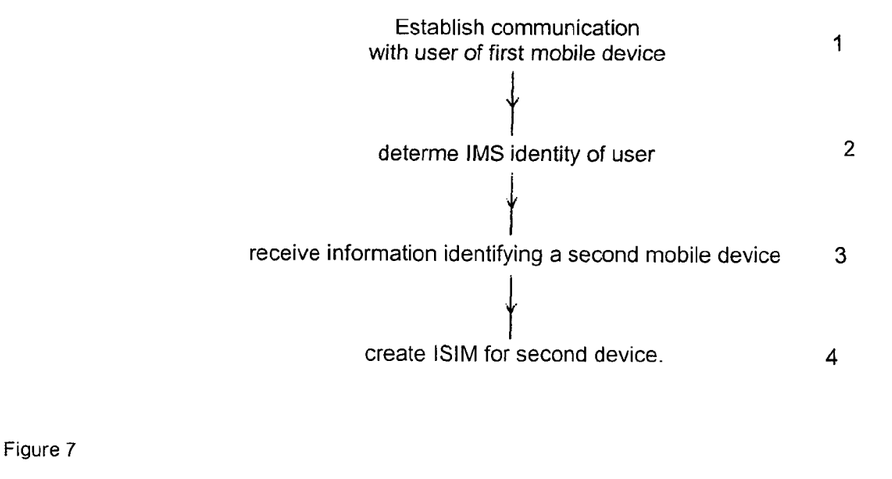
FIG. 7 is a block flow diagram of a method according to the present invention.

FIG. 7 is a block flow diagram illustrating the principal steps carried out by the IMS Network when provisioning a second mobile device. Thus, the IMS Network initially establishes communication with the first mobile device (device A) at step 1 of FIG. 7. At step 2 of FIG. 7 the IMS Network determines the IMS identity of the subscriber behind the first mobile device (this corresponds generally to step 2 of FIG. 4). At step 3 of FIG. 7, the IMS Network receives information identifying a second mobile device (i.e., device B)—this corresponds to the receipt of the TRE identity of device B in FIG. 4. Finally, at step 3 of FIG. 7, the IMS Network creates an ISIM for the second mobile device, and this corresponds to step 4 of FIG. 4. The ISIM for the second mobile device may then be sent to the second mobile device.

DLUSIM and DLISIM Bundled Architecture

In a further embodiment of the invention, a business actor offering both downloadable USIM (DLUSIM) and downloadable ISIM (DLISIM) provisioning services may co-locate the DLUSIM Discovery Function and the DLISIM Discovery Function in the same server, and/or may co-locate the DLUSIM Provisioning Function and the DLISIM Provisioning Function in the same server (which server may or may not be the same as the server in which the DLUSIM Discovery Function and the DLISIM Discovery Function are co-located in an embodiment in which the DLUSIM Discovery Function and the DLISIM Discovery Function are co-located and the DLUSIM Provisioning Function and the DLISIM Provisioning Function are co-located). This may reduce costs, by avoiding the need to maintain two separate architectures.

In order to discriminate between DLUSIM and DLISIM discovery/provisioning, where the DLUSIM and DLISIM Discovery/Provisioning Functions are co-located, there are two possible alternatives:

DLUSIM and DLISIM services may be provided by the same server, but under different URI or ports; or DLUSIM and DLISIM services are provided under the same URI, and all discovery or provisioning requests need to carry an application ID identifying whether DLUSIM discovery/provisioning or DLISIM discovery/provisioning is requested.

DLUSIM and DLISIM may both be provisioned in a single procedure if so requested by the device and the network services have been also pre-provisioned to allow this option for a certain mobile device. For example, a request from a mobile device may indicate that both DLUSIM and DLISIM are required. Provisioning both DLUSIM and DLISIM in a single procedure may happen when an operator has agreed with a subscriber to provide both connectivity and IMS services to a device, or to a plurality of device. The operator prepares a Provisioning Function to download the USIM & ISIM in a single procedure based on the TRE identity of the Mobile Device, and prepares the Discovery Function to identify this Provisioning Function. This case is for Networks who act as both connectivity and IMS Networks.

Where the DLUSIM Discovery Function and the DLISIM Discovery Function are co-located, discovery may be effected in a manner similar to that shown in FIG. 2. When the registration of the mobile device 1 to the IMS Registration Network 2 is complete the S-CSCF of the IMS Registration Network 2 evaluates the initial filter criteria, and determines whether a DLUSIM and/or a DLISIM is required. Compared to the method of FIG. 2, the REGISTER request sent to the Discovery Function 3 at step 2 of FIG. 2 will additionally identify whether a DLUSIM and/or a DLISIM is required, for example by directing the message to the appropriate port of Discovery function AS, or by including an application ID identifying whether DLUSIM discovery or DLISIM discovery is required. The discovery function then encodes and signs DLUSIM discovery information or DLISIM discovery information at step 4 as appropriate and sends it to the mobile device. (It should be noted that this described process is only one possible process, and that variations on the described process will be apparent to, and can be formulated by, a skilled person based on this description.)

Similarly, where the DLUSIM Provisioning Function and the DLISIM Provisioning Function are co-located, provisioning may be effected in a manner similar to that shown in FIG. 3. The SIP request sent to the Provisioning Function at step 2 of FIG. 3 will additionally identify whether a DLUSIM and/or a DLISIM is required, for example by directing the message to the appropriate port of the Provisioning function AS, or by including an application ID identifying whether DLUSIM provisioning or DLISIM provisioning is required. The Provisioning function then encodes and signs DLUSIM Provisioning information or DLISIM Provisioning information at step 3 as appropriate and sends it to the mobile device. (It should again be noted that this described process is only one possible process, and that variations on the described process will be apparent to, and can be formulated by, a skilled person based on this description.)

Figure 6:
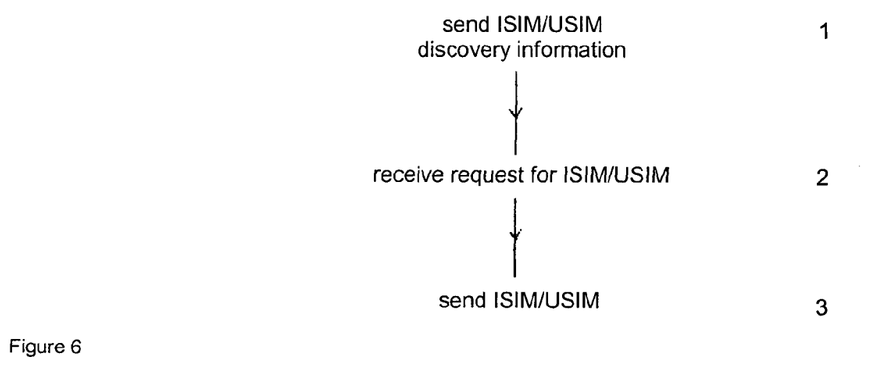
FIG. 6 is a block flow diagram of a method according to the present invention.

As noted above, in one embodiment the DLUSIM Discovery Function, the DLISIM Discovery Function, the DLUSIM Provisioning Function and the DLISIM Provisioning Function Provisioning Function 4 may be co-located in one application server, for example located in the IMS Registration Network 2 of FIG. 2. FIG. 6 is a block flow diagram illustrating the principal steps carried out by the application server in this case. Initially, at step 1, the application server sends ISIM or USIM discovery information to the mobile device, in response to an ISIM or ISIM provisioning request from the mobile device or from the user of the mobile device. Step 1 of FIG. 6 corresponds generally to steps 4 and 5 of FIG. 2.

Next, at step 2 of FIG. 6, the application server receives a request from the mobile device for an ISIM or USIM (this corresponds generally to step 2 of FIG. 3). In response, at step 3 of FIG. 6, the application sends an ISIM or USIM to the mobile device (this corresponds generally to steps 3 and 4 of FIG. 3).

ADVANTAGES OF THE INVENTION

As will be understood from the above description, the present invention provides a number of advantages over prior methods. Firstly, it enables use of IMS infrastructure and services for discovery and provisioning purposes. This provides better scalability of discovery and provisioning compared to manual procedures, so making it possible to handle discovery and provisioning for large numbers of devices, and also provides reduced operating expenses owing to the use of automated remote management procedures. Furthermore, the improved discovery and provisioning processes are expected to support user acceptance and deployment, to lead to value added services to IMS, and to lead to an improved user experience by making it possible for the user to start using a new device more quickly.

The invention may also further provide a simplified ISIM provisioning process for provisioning an additional device using an existing IMS subscription.

The invention may also further provide a simplified process for provisioning a mobile device with both a USIM and an ISIM.

Furthermore, the invention can support different business models, for example the invention can support outsourcing the provisioning process to a provisioning broker, or may allow user involvement in the discovery process.

It should be understood that the embodiments of the invention that are described above are only examples of the invention, and that variations on the described embodiments will be apparent to, and can be formulated by, a skilled person based on this description. The scope of the invention is therefore not limited to the described embodiments.

ABBREVIATIONS

ISIM IM Services Identity Module
USIM Universal Subscriber Identity Module
UICC Universal Integrated Circuit Card
GBA Generic Bootstrapping Architecture
PKI Public Key Infrastructure
CRL Certificate Revocation List
OCSP Online Certificate Status Protocol
TRE TRusted Environment
DLUSIM Downloadable USIM
MCIM Machine Communication Identity Module
TPM Trusted Platform Module

The invention claimed is:

1. An IMS (IP Multimedia Subsystem) network, comprising:
   at least one application server configured to provision a mobile device over the IMS network and comprising a node of the IMS network, the at least one application server comprising:
   at least one processor; and
   at least one memory coupled to the at least one processor, the at least one memory comprising a non-transitory computer readable medium having computer readable program code embodied therein that is executed by the at least one processor to perform operations comprising:
   (1) a discovery function for providing ISIM (IP Multimedia Subscriber Identity Module) discovery information over the IMS network, the discovery function identifying a provisioning function to the mobile device by sending a Session Initiation Protocol (SIP) message comprising the ISIM discovery information from the IMS network to the mobile device, wherein the mobile device is registered with the IMS network using a provisioning ISIM; and
   (2) the provisioning function for providing an operational ISIM to the mobile device over the IMS network by sending a SIP message comprising the operational ISIM from the IMS network to the mobile device in response to a request transmitted from the mobile device to the at least one application server over the IMS network based on the provisioning function identified in the ISIM discovery information, wherein the IMS network temporarily uses the provisioning ISIM to identify the mobile device while performing the discovery function to provide the ISIM discovery information over the IMS network to the mobile device, and then uses the operational ISIM provided to the mobile device by the provisioning function to identify the mobile device without further use of the provisioning ISIM to identify the mobile device.

2. The IMS network as claimed in claim 1, wherein the application server comprising the node of the IMS network comprises the discovery function, and wherein the operations by the IMS network further comprise to detect an IMS registered device that requires ISIM provisioning based on the provisioning ISIM stored in a trusted element (TRE) of the IMS registered device, and to provide the ISIM discovery information identifying the provisioning function for the mobile device responsive to detection of the IMS registered device.

3. The IMS network as claimed in claim 1, wherein the application server comprising the node of the IMS network comprises the discovery function, and wherein the operations by the IMS network further comprise to provide, in response to an ISIM subscription provisioning request from the user, the ISIM discovery information identifying the provisioning function for the mobile device.

4. The IMS network as claimed in claim 1, wherein the application server comprising the node of the IMS network comprises the discovery function, and wherein the operations by the IMS network further comprise to provide, in response to an ISIM subscription provisioning request from the mobile device, the ISIM discovery information identifying the provisioning function for the mobile device.

5. The IMS network as claimed in claim 1, wherein the application server comprising the node of the IMS network comprises the discovery function and wherein the operations by the IMS network further comprise to provide the discovery information identifying at least one of: the provisioning function in the IMS network; the provisioning function in another IMS network; or the provisioning function in a third party network.

6. The IMS network as claimed in claim 1, wherein the application server comprising the node of the IMS network comprises the discovery function, the discovery function being adapted to provide both of the ISIM discovery information and USIM (Universal Subscriber Identity Module) discovery information to the mobile device.

7. The IMS network as claimed in claim 1, wherein the application server comprising the node of the IMS network comprises the provisioning function, the provisioning function being adapted to provide both of the operational ISIM and a USIM to the mobile device.

8. The IMS network as claimed in claim 1, wherein the IMS network comprises the discovery function and the provisioning function, wherein at least one of the discovery function or the provisioning function is pre-provisioned with an identity of a trusted element of the mobile device prior to providing the ISIM discovery information thereto, and wherein the trusted element of the mobile device is to store an address and/or identity of the provisioning function responsive to providing the ISIM discovery information thereto.

9. A method of provisioning a mobile device with an IMS (IP Multimedia Subsystem) subscription over an IMS network, the method comprising:
(1) sending, from the IMS network, a Session Initiation Protocol (SIP) message comprising discovery information identifying an ISIM (IP Multimedia Subscriber Identity Module) provisioning function to the mobile device,
wherein the mobile device is registered with the IMS network using a provisioning ISIM; and
(2) in response to a SIP request received at the IMS network from the mobile device based on the provisioning function identified in the discovery information, sending, from the IMS network, a SIP message comprising an operational ISIM to the mobile device, wherein the IMS network temporarily uses the provisioning ISIM to identify the mobile device while performing a discovery function to send the discovery information identifying the ISIM provisioning function over the IMS network to the mobile device, and then uses the operational ISIM provided to the mobile device by the ISIM provisioning function to identify the mobile device without further use of the provisioning ISIM to identify the mobile device.

10. The method as claimed in claim 9 and comprising sending the discovery information identifying the ISIM provisioning function to the mobile device upon one of: detecting an IMS registered device that requires ISIM provisioning based on the provisioning ISIM stored in a trusted element (TRE) of the IMS registered device; receiving an ISIM provisioning request from a user of the mobile device; and receiving an ISIM provisioning request from the mobile device.

11. The method as claimed in claim 9, wherein the IMS network sends to the mobile device the discovery information identifying the IMS network as the ISIM provisioning function.

12. The method as claimed in claim 11, and further comprising:
receiving, at the IMS network, the request for the operational ISIM from the mobile device; and
sending the operational ISIM from the IMS network to the mobile device in response to receiving the request.

13. The method as claimed in claim 9, wherein the IMS network sends to the mobile device the discovery information identifying another IMS network as the ISIM provisioning function.

14. The method as claimed in claim 9, wherein the IMS network sends to the mobile device the discovery information identifying a third party network as the ISIM provisioning function.

15. The method as claimed in claim 9 wherein the IMS network sends both of ISIM discovery information and USIM (Universal Subscriber Identity Module) discovery information to the mobile device.

16. The method as claimed in claim 9, wherein the IMS network sends, in response to the request, both the operational ISIM and a USIM (Universal Subscriber Identity Module) to the mobile device.

17. A method of provisioning a mobile device over an IMS network with an IMS (IP Multimedia Subsystem) subscription, the method comprising:
inputting discovery information received in a Session Initiation Protocol (SIP) message from the IMS network into the mobile device, the discovery information identifying an ISIM (IP Multimedia Subscriber Identity Module) provisioning function for the mobile device;
sending a SIP request message comprising a provisioning request from the mobile device to the IMS network based on the ISIM provisioning function identified in the discovery information,
wherein the mobile device is registered with the IMS network using a provisioning ISIM; and
provisioning, at the mobile device, an operational ISIM that is received in a SIP response message from the IMS network in response to sending the SIP request message comprising the provisioning request from the mobile device to the ISIM provisioning function,
using the provisioning ISIM to identify the mobile device while receiving the discovery information from the IMS network into the mobile device, and then using the operational ISIM provided to the mobile device by the provisioning to identify the mobile device without further use of the provisioning ISIM to identify the mobile device.

18. A method as claimed in claim 17, further comprising:
receiving, at the mobile device, the discovery information from a discovery function of an IMS network, wherein the discovery information comprises an address and/or identity of the ISIM provisioning function in the IMS network; and
storing, in a trusted element of the mobile device, the address and/or identity of the ISIM provisioning function identified in the discovery information prior to sending the provisioning request thereto.

19. An IMS (IP Multimedia Subsystem) network element of an IMS network, the IMS network element comprising:
at least one processor; and
at least one memory coupled to the at least one processor, the at least one memory comprising a non-transitory computer readable medium having computer readable program code embodied therein that is executed by the at least one processor to perform operations comprising:
(1) a discovery function for providing ISIM (IP Multimedia Subscriber Identity Module) discovery information over the IMS network, the discovery function identifying a provisioning function to a mobile device by sending a Session Initiation Protocol (SIP) message comprising the ISIM discovery information from the IMS network to the mobile device, wherein the mobile device is registered with the IMS network using a provisioning ISIM; and
(2) the provisioning function for providing an operational ISIM to the mobile device over the IMS network by sending a SIP message comprising the ISIM from the IMS network to the mobile device in response to a request transmitted from the mobile device to the IMS network element over the IMS network based on the provisioning function identified in the ISIM discovery information,
wherein the IMS network element comprises a node of the IMS network, and
wherein the IMS network temporarily uses the provisioning ISIM to identify the mobile device while performing the discovery function to provide the ISIM discovery information over the IMS network to the mobile device, and then uses the operational ISIM provided to the mobile device by the provisioning function to identify the mobile device without further use of the provisioning ISIM to identify the mobile device.

20. The IMS network element as claimed in claim 19, wherein the IMS network element comprises the discovery function, and wherein the operations by the IMS network element further comprise to detect an IMS registered device that requires ISIM provisioning based on the provisioning ISIM stored in a trusted element (TRE) of the IMS registered device and to provide the ISIM discovery information identifying the provisioning function for the mobile device responsive to detection of the IMS registered device.

21. The IMS Network element as claimed in claim 19, wherein the IMS network element comprises the discovery function, and wherein the operations by the IMS network element further comprise to provide, in response to an ISIM subscription provisioning request from the user, the ISIM discovery information identifying the provisioning function for the mobile device.

22. The IMS network element as claimed in claim 19, wherein the IMS network element comprises the discovery function, and wherein the operations by the IMS network element further comprise to provide, in response to an ISIM subscription provisioning request from the mobile device, the ISIM discovery information identifying the provisioning function for the mobile device.

23. The IMS network element as claimed in claim 19, wherein the IMS network element comprises the discovery function and wherein the operations by the IMS network element further comprise to provide the discovery information identifying at least one of: the provisioning function in the IMS network; the provisioning function in another IMS network; or the provisioning function in a third party network.

24. The IMS network element as claimed in claim 19 wherein the IMS network element comprises the discovery function, the discovery function being adapted to provide both of the ISIM discovery information and USIM (Universal Subscriber Identity Module) discovery information to the mobile device.

25. The IMS network element as claimed in claim 19 wherein the IMS network element comprises the provisioning function, the provisioning function being adapted to provide both of the operational ISIM and a USIM to the mobile device.

* * * * *